(No Model.)
R. S. WARING.
COMPOUND ELECTRIC CABLE.
No. 295,086. Patented Mar. 11, 1884.
Fig. 1
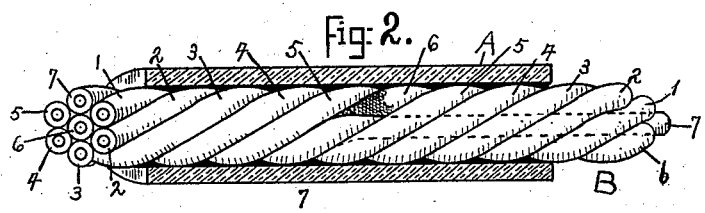
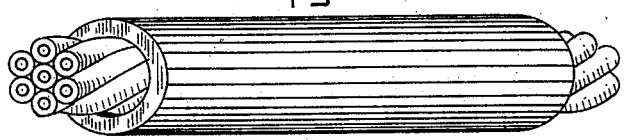
| Fig. 4. | Fig. 5. | Fig. 6. |
|---|---|---|
|  |  |  |
| Fig. 7. | Fig. 8. | Fig. 9. |
|  |  |  |
Fig. 10.
WITNESSES:
R. H. Whittesey
C. M. Clarke
Richard S. Waring, INVENTOR
By George H. Christy
ATTORNEY
N. PETERS, Photo-Lithographer, Washington, D. C.

UNITED STATES PATENT OFFICE.

RICHARD S. WARING, OF PITTSBURG, PENNSYLVANIA.

COMPOUND ELECTRIC CABLE.

SPECIFICATION forming part of Letters Patent No. 295,086, dated March 11, 1884.

Application filed December 28, 1883. (No model.) Patented in Germany November 28, 1882, No. 25,772; in England November 29, 1882, No. 5,673; in France November 29, 1882, No. 152,367; in Belgium November 30, 1882, No. 59,707; in Austria-Hungary February 13, 1883, No. 40,898, and in Spain June 8, 1883, No. 2,920.

*To all whom it may concern:*

Be it known that I, RICHARD S. WARING, a citizen of the United States, residing at Pittsburg, county of Allegheny, State of Pennsylvania, have invented or discovered a new and useful Improvement in Compound Electric Cables; and I do hereby declare the following to be a full, clear, concise, and exact description thereof, reference being had to the accompanying drawings, making a part of this specification, in which—like letters indicating like parts—

Figure 1 is a transverse sectional view of an electric cable formed by twisting together a number of insulated conductors. Fig. 2 is a side elevation of the same, also showing the lead sheathing for the same in section. Fig. 3 is a side elevation of the cable and sheathing. Figs. 4 to 10 are diagrammatic views, showing the positions of the conductors at different places along the cable.

My invention relates to that class of electric cables which are composed of a number of insulated conductors twisted together in a manner similar to the strands of a rope, the twisted conductors being surrounded by a suitable metallic sheathing, preferably lead; and my invention consists, in general terms, in the construction and combination of the parts of such a cable, all as more fully hereinafter described and claimed. The electric currents which the current in one wire, when in use for telegraphic or telephonic purposes, induces in those in close proximity to it have been the source of great difficulty in the use of this class of cables, and to overcome this difficulty it is necessary to electrically connect the conductors of each cable to the earth, in order to carry off these induced currents, which interfere with the proper working of the conductors; and, further, in these twisted cables, as heretofore constructed, it has been necessary to disturb and open up the outside row of conductors in order to gain access to the interior conductors for any purpose.

The object of my invention is to obviate the above and other defects; and to this end I so construct my cable that every wire in the cable shall, at certain intervals, form one of the outer rows of conductors, and hence be in contact with the metallic sheathing, and in such position as to be readily reached at these points without disturbing any of the other conductors.

In the drawings, A indicates the metallic protecting covering or sheath, in which is placed the cable B. This cable B is composed of a series of insulated wires, 1 2, &c., twisted together in a manner somewhat similar to that employed in twisting the strands of a rope or cable. In forming this twisted cable the conductors are arranged at one end, as shown in Fig. 4, one of the conductors, as 7, forming the center or core. The conductors are then twisted together, as shown in Fig. 1. After they have been twisted together for a distance of three or four feet, more or less, the center or core conductor, 7, and one of the outside conductors, as 6, are bent or twisted around each other, so as to bring the conductor 7 to the outside and place the conductor 6 on the inside, (see Fig. 5,) where it will, for a distance of three or four feet, form the center or core of the cable, as shown in Figs. 2 and 3. After this change of position of the conductors 6 and 7 has been effected, all the conductors are again twisted together, as before, for a distance of three or four feet, more or less, and then the twisting is again stopped, and the conductor 6 and one of the outside conductors, as 5, are bent around each other, so as to bring the conductor 5 to the inside and the conductor 6 to the outside of the cable, as shown at Fig. 6. The above-described operations of twisting the conductors and changing their location at intervals are continued until the desired length of cable is completed.

By constructing a cable in the manner above described, each conductor is readily accessible, except for short intervals, throughout the entire length of the cable, and branches or loops can be formed at practically any point in each conductor without materially disturbing any of the other conductors.

After the cable has been formed as above described, it is drawn through or has formed around it a covering or sheathing, A, of some suitable flexible metal or alloy, preferably of lead. It is evident that, as the covering A fits the cable closely, every one of the conductors will be in contact with the covering, with the exception of short distances throughout the entire length of such conductors, and therefore ample opportunity is afforded for carrying off all induced currents from each conductor. This cable is adapted for underground cables or aerial cables. If used as aerial cable, the covering A should be electrically connected with the ground at suitable intervals for carrying off the induced currents in said covering.

Index-marks may be placed on the covering A, to indicate the places where the location of two of the conductors is changed, as above described, and said marks may further indicate which of the conductors at those places is changed from the outside to the inside of the inclosed cable B.

This twisted cable may be covered by passing it through a suitable lead-press.

I am aware that it is old to arrange the conductors of a cable in two or more concentric series having layers of conducting material between said series, and having the single continuous conductors located in different series in different portions of their length.

I claim herein as my invention—

1. The method of forming electric cables, which consists in twisting together one central and a series of surrounding insulated electric conductors for a short distance, interchanging in position the central or core conductor and one of the outside conductors, so as to bring the central conductor into the outer series, and repeating these steps at suitable intervals throughout the entire length of the cable, substantially as set forth.

2. The method of forming electric cables, which consists in twisting together one central and a series of surrounding insulated electric conductors for a short distance, interchanging in position the central or core conductor and one of the outside conductors, so as to bring the central conductor into the outer series, repeating these steps at suitable intervals throughout the entire length of the cable, and inclosing the prepared cable within a metallic sheath, substantially as set forth.

3. An electric cable having a central and a series of surrounding insulated conductors twisted together, each surrounding conductor in turn forming the center or core of the cable, substantially as set forth.

4. An electric cable having a central and a series of surrounding insulated conductors twisted together, each surrounding conductor in turn forming the center or core of the cable, in combination with a suitable metallic covering or sheath, substantially as set forth.

In testimony whereof I have hereunto set my hand.

RICHARD S. WARING.

Witnesses:
D. RITTENHOUSE,
W. H. A. WORMLEY.